US008420715B2

(12) United States Patent
Lee et al.

(10) Patent No.: US 8,420,715 B2
(45) Date of Patent: *Apr. 16, 2013

(54) ENCAPSULATED COLORANT AND INK COMPOSITION INCLUDING THE SAME

(75) Inventors: Jong-in Lee, Suwon-si (KR); Heung-sup Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

This patent is subject to a terminal disclaimer.

(21) Appl. No.: 12/198,323

(22) Filed: Aug. 26, 2008

(65) Prior Publication Data

US 2009/0093586 A1 Apr. 9, 2009

(30) Foreign Application Priority Data

Oct. 5, 2007 (KR) ........................ 10-2007-0100341

(51) Int. Cl.
*C08K 9/00* (2006.01)

(52) U.S. Cl.
USPC ........... 523/205; 347/100; 523/160; 523/161; 523/200; 523/206; 524/495; 524/496; 524/522; 524/523

(58) Field of Classification Search ............... 106/31.45, 106/31.58, 31.75, 31.86; 347/100; 523/160, 523/161, 200, 205, 206; 524/555, 556, 558, 524/560, 495, 496, 522, 523
See application file for complete search history.

(56) References Cited

U.S. PATENT DOCUMENTS

| 3,806,464 A * | 4/1974 | Matrick et al. ............... 523/205 |
| 3,876,603 A * | 4/1975 | Makhlouf ..................... 523/210 |
| 4,036,652 A * | 7/1977 | Rothmayer .................... 524/88 |
| 4,694,302 A | 9/1987 | Hackleman et al. |
| 5,172,133 A | 12/1992 | Suga et al. |
| 5,529,616 A | 6/1996 | Prasad |
| 5,623,294 A | 4/1997 | Takizawa et al. |
| 5,629,359 A | 5/1997 | Peeters et al. |
| 5,889,083 A * | 3/1999 | Zhu ............................... 523/161 |
| 6,864,302 B2 * | 3/2005 | Miyabayashi ............... 523/160 |
| 6,877,850 B2 * | 4/2005 | Ishimoto et al. ............. 347/100 |
| 6,916,862 B2 * | 7/2005 | Ota et al. ...................... 523/200 |
| 6,946,023 B2 | 9/2005 | Mammen et al. |
| 7,008,977 B2 | 3/2006 | Sakai et al. |
| 7,105,263 B2 | 9/2006 | Moudry et al. |
| 7,119,133 B2 | 10/2006 | Vincent et al. |
| 7,307,109 B2 | 12/2007 | Yatake et al. |
| 2003/0029355 A1 * | 2/2003 | Miyabayashi ............. 106/31.27 |
| 2003/0145761 A1 * | 8/2003 | Redfearn et al. ............ 106/31.6 |
| 2005/0004263 A1 * | 1/2005 | Gould et al. .................. 523/160 |
| 2005/0276774 A1 * | 12/2005 | Elder et al. .................... 424/70.1 |
| 2007/0129462 A1 * | 6/2007 | Ma ................................ 523/160 |
| 2007/0129463 A1 * | 6/2007 | Ma et al. ....................... 523/160 |
| 2007/0219291 A1 * | 9/2007 | Doi et al. ...................... 523/160 |
| 2008/0269374 A1 * | 10/2008 | Ganapathiappan .......... 523/201 |

FOREIGN PATENT DOCUMENTS

| JP | 11-116881 | 4/1999 |
| JP | 2007-254502 | 10/2007 |
| KR | 10-2005-0071326 | 7/2005 |
| KR | 1020070074033 | 7/2007 |

OTHER PUBLICATIONS

Korean Office Action dated May 10, 2012 issued in KR Application No. 10-2007-0100341.
Notice of Allowance issued in KR 10-2007-0100341 dated Nov. 27, 2012.

* cited by examiner

*Primary Examiner* — David W Wu
*Assistant Examiner* — Marie Reddick
(74) *Attorney, Agent, or Firm* — Stanzione & Kim, LLP

(57) ABSTRACT

An encapsulated colorant including a colorant and a polymer resin coating the colorant, where the polymer resin is prepared by polymerizing a polymer resin-forming composition including two or more polymerizable unsaturated monomers, and the content ratio of the two or more polymerizable unsaturated monomers is controlled to obtain a glass transition temperature of the polymer resin of −15 to 75° C. An ink composition including an encapsulated colorant, and an ink set comprising two or more types of the ink composition. The encapsulated colorant may have different glass transition temperatures to have a utility of high optical density when printing text, and high gloss when printing images.

3 Claims, 2 Drawing Sheets

ENCAPSULATED COLORANT AND INK COMPOSITION INCLUDING THE SAME

CROSS-REFERENCE TO RELATED APPLICATIONS

This application claims priority under 35 U.S.C. §119(a) from Korean Patent Application No. 10-2007-0100341, filed on Oct. 5, 2007, in the Korean Intellectual Property Office, the disclosure of which is incorporated herein in its entirety by reference.

BACKGROUND OF THE INVENTION

1. Field of the Invention

The present general inventive concept relates to an encapsulated colorant, and an ink composition including the encapsulated colorant, and more particularly, to an encapsulated colorant including a colorant and a polymer resin which coats the colorant, wherein the hardness of the encapsulated colorant is controlled through the glass transition temperature of the polymer resin to have a utility of a high optical density when printing text, and a high glossiness when printing images.

2. Description of the Related Art

Conventionally, in inkjet printers, a colorant refers to a material that selectively absorbs or reflects visible light and provides a unique color. Colorants can include dyes and pigments.

A dye refers to a coloring agent which is colored using a given method on a material to be dyed such as fiber, leather, fur, and paper, and has a high solar light fastness, washing fastness and abrasion fastness. A pigment refers to microparticles containing a colorant, which are not directly dyed on the surface of a material to be colored, but are attached to the surface of the material using a physical method, such as bonding, to provide a unique color.

Dyes mix with and are dissolved in solvents such as water, but because pigments are generally insoluble in solvents such as water, it is very important to evenly disperse the pigment microparticles within the solution to permanently stabilize and maintain the dispersed pigment microparticles so that the pigment microparticles do not reflocculate.

Water-soluble dye-type ink has good long-term storage stability, maintains homogeneity, and has sharp colors and brightness, but has poor water resistance and light resistance properties.

Pigment-type ink has a high optical density (OD), has good fastness to water and light, and relatively low smudging between colors, but has poor long term storage stability compared to the dye-type ink. Moreover, a image printed with pigment-type ink has poor rubbing fastness under dry and wet conditions; that is, abrasion resistance is low.

In addition, while printing in color (multiple-color printing) with a dye or pigment, bleeding of boundaries between colors may occur, reducing the clarity of the image. Therefore, an ink composition which maintains good storage stability of water-soluble dye-type ink, along with good water fastness of pigment-type ink, with enhanced print gloss and abrasion resistance, is required.

Meanwhile, in order to improve the abrasion resistance of ink, a technique of adding a resin to ink compositions has been suggested. However, the addition of a resin may cause an increase in the ink viscosity, a problem which has yet to be overcome. Also, a technology of adding resin particles to ink in order to suppress the viscosity increase of the ink has been suggested, but because the resin particles and the pigment are dispersed separately in the ink, the abrasion resistance cannot be sufficiently improved.

Therefore, the addition of new additives to ink compositions causes limitations in overcoming the problems mentioned above. Thus, there is a need to improve ink composition properties by reforming the colorant itself.

SUMMARY OF THE INVENTION

The present general inventive concept provides an encapsulated colorant used in an ink composition, where the hardness of the encapsulated colorant including a polymer resin can be controlled through the glass transition temperature of the polymer resin, thereby having a utility of high optical density when printing text, and high gloss printing when printing images.

The present general inventive concept also provides an ink composition including the encapsulated colorant.

The present general inventive concept also provides an ink set which includes two or more types of the ink composition.

The present general inventive concept also provides an ink cartridge which includes the ink set.

The present general inventive concept also provides an inkjet recording device which includes a cartridge for the inkjet recording device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an encapsulated colorant including a colorant and a polymer resin to coat the colorant, where the polymer resin is a polymer resin formed from a composition having two or more polymerizable unsaturated monomers, and the content ratio of the two or more polymerizable unsaturated monomers is controlled to have a glass transition temperature of the polymer resin of −15 to 75° C.

The foregoing and/or other aspects and utilities of the present general inventive concept may also be achieved by providing an ink composition including a solvent and an encapsulated colorant, where the encapsulated colorant has colorant and a polymer resin to coat the colorant, where the polymer resin is a polymer resin formed from a composition having two or more polymerizable unsaturated monomers, and the content ratio of the two or more polymerizable unsaturated monomers is controlled to have a glass transition temperature of the polymer resin of −15 to 75° C.

The foregoing and/or other aspects and utilities of the present general inventive concept may also be achieved by providing an ink set including two or more types of an ink composition including a solvent and an encapsulated colorant, where the encapsulated colorant has colorant and a polymer resin to coat the colorant, where the polymer resin is a polymer resin formed from a composition having two or more polymerizable unsaturated monomers, and the content ratio of the two or more polymerizable unsaturated monomers is controlled to have a glass transition temperature of the polymer resin of −15 to 75° C.

The foregoing and/or other aspects and utilities of the present general inventive concept may also be achieved by providing a cartridge for an inkjet recording device including an ink set having two or more types of ink composition, each having an encapsulated colorant with a colorant and a polymer resin to coat the colorant, where the polymer resin is a polymer resin formed from a composition having two or more polymerizable unsaturated monomers, and the content ratio of the two or more polymerizable unsaturated monomers is controlled to have a glass transition temperature of the polymer resin of −15 to 75° C., and where the ink set includes one or more types of ink composition having an encapsulated colorant having a polymer resin with a glass transition temperature of −15 to 25° C., and one or more types of ink composition having an encapsulated colorant having a polymer resin with a glass transition temperature of 30 to 75° C.

The foregoing and/or other aspects and utilities of the present general inventive concept may also be achieved by providing an inkjet recording device including a cartridge for the inkjet recording device including an ink set having two or more types of ink composition, each having an encapsulated colorant with a colorant and a polymer resin to coat the colorant, where the polymer resin is a polymer resin formed from a composition having two or more polymerizable unsaturated monomers, and the content ratio of the two or more polymerizable unsaturated monomers is controlled to have a glass transition temperature of the polymer resin of −15 to 75° C., and where the ink set includes one or more types of ink composition having an encapsulated colorant having a polymer resin with a glass transition temperature of −15 to 25° C., and one or more types of ink composition having an encapsulated colorant having a polymer resin with a glass transition temperature of 30 to 75° C.

The foregoing and/or other aspects and utilities of the present general inventive concept may also be achieved by providing an ink composition for inkjet recording, including a colorant and a polymer resin to coat the colorant, where a content ratio of a composition of the polymer resin is controlled to have a glass transition temperature of −15 to 75° C.

The polymer resin may be a polymer resin formed from a composition having two or more polymerizable unsaturated monomers, and the content ratio of the two or more polymerizable unsaturated monomers may be controlled to have a glass transition temperature of the polymer resin of −15 to 75° C.

The polymerizable unsaturated monomers may be at least one of the group consisting of unsaturated carboxylic acid, vinyl cyanide monomer, unsaturated carboxylic acid alkyl ester, unsaturated carboxylic acid hydroxyalkyl ester, unsaturated carboxylic acid amine and its derivatives, aromatic vinyl monomer, methyl vinyl ketone, and vinyl-idene chloride.

The ink composition may also include a solvent, and the solvent may include one or more organic solvents such as a monohydric alcohol-based solvent, a ketone-based solvent, an ester-based solvent, a polyhydric alcohol-based solvent, a nitrogen-containing solvent, dimethyl sulfoxide, tetramethylsulfone, and a sulfur-containing thioglycol compound.

The content of the colorant may be 0.1 to 30 parts by weight and the content of the solvent may be 70 to 99.9 parts by weight, based on 100 parts by weight of the ink composition.

The colorant may include at least one from the group of dyes, direct dyes, acidic dyes, alkaline dyes, reactive dyes, dispersant dyes, oil-based dyes, pigments, and self-dispersing pigments.

The colorant may include at least one from the group of Food Black dyes, Food Red dyes, Food Yellow dyes, Food Blue dyes, Acid Black dyes, Acid Red dyes, Acid Blue dyes, Acid Yellow dyes, Direct Black dyes, Direct Blue dyes, Direct Yellow dyes, anthraquinone dyes, monoazo dyes, diazo dyes, and phthalocyanine derivatives.

The colorant may include at least one of from the group of carbon black, graphite, vitreous carbon, activated charcoal, activated carbon, anthraquinone, phthalocyanine blue, phthalocyanine green, diazos, monoazos, pyranthrones, perylene, quinacridone, and indigoid pigments.

The colorant may include at least one from the group consisting of cabojet-series and CW-series (Orient Chemical).

According to the present general inventive concept, the glass transition temperature of the polymer resin coating the capsulated colorant may be controlled such that the colorant coated with the polymer resin with a high glass transition temperature expresses hard properties, and the colorant coated with the polymer resin with a low glass transition temperature expresses soft properties. In addition, the capsulated colorant with different glass transition temperature can be used to provide an ink composition and an ink set including the ink composition which may have a utility of improved water fastness, optical density, and abrasion resistance when printing text, and improved endurance and print gloss when printing images.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
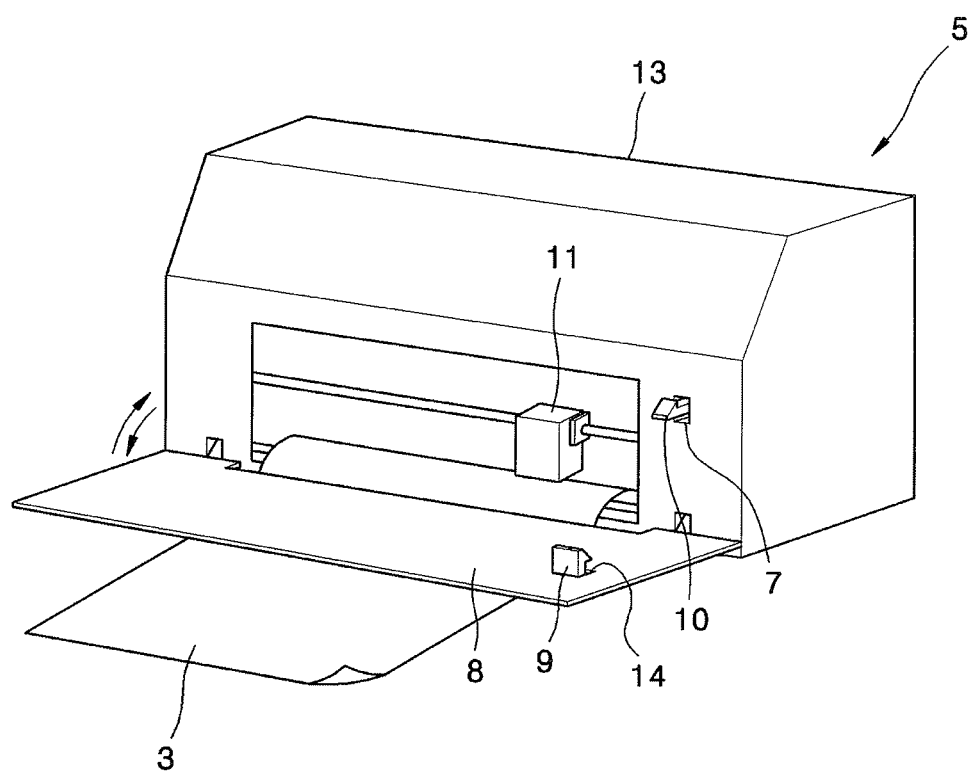
FIG. 1 illustrates a perspective view of an inkjet recording device including an ink cartridge, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept provides an encapsulated colorant including a colorant and a polymer resin coating the colorant, wherein the polymer resin is prepared by polymerizing a polymer resin-forming composition including two or more polymerizable unsaturated monomers, and the content ratio of the two or more polymerizable unsaturated monomers is controlled to obtain a glass transition temperature of −15 to 75° C.

For the colorant of the present general inventive concept, both dyes and pigments may be used, and any colorants that are conventionally available in the art may be used without limitations. That is, at least one of direct dyes, acidic dyes, alkaline dyes, reactive dyes, dispersant dyes, oil-based dyes, pigments, self-dispersing pigments may be used.

In particular, the dyes may include Food Black dyes, Food Red dyes, Food Yellow dyes, Food Blue dyes, Acid Black dyes, Acid Red dyes, Acid Blue dyes, Acid Yellow dyes, Direct Black dyes, Direct Blue dyes, Direct Yellow dyes, anthraquinone dyes, monoazodyes, diazo dyes, and phthalocyanine derivatives. The pigments may include carbon black, graphite, vitreous carbon, activated charcoal, activated carbon, anthraquinone, phthalocyanine blue, phthalocyanine green, diazos, monoazos, pyranthrones, perylene, quinacridone, and indigoid pigments, and the self-dispersing pigments may include cabojet-series, CW-series (Orient Chemical) and the like, but are not limited thereto.

The polymer resin may be prepared by polymerizing a polymer resin-forming composition including two or more polymerizable unsaturated monomers.

Here, the polymerizable unsaturated monomers may be at least one of unsaturated carboxylic acid, vinyl cyanide monomer, unsaturated carboxylic acid alkyl ester, unsaturated carboxylic acid hydroxyalkyl ester, unsaturated carboxylic acid amide and its derivatives, aromatic vinyl monomer, methyl vinyl ketone, and vinyl-idene chloride.

More specifically, the unsaturated carboxylic acid may be at least one of methacrylic acid, itaconic acid, crotonic acid, fumaric acid, and maleic acid; the unsaturated carboxylic acid alkyl ester may be at least one of itaconic acid monoethyl ester, fumaric acid monobutyl ester, and maleic acid monobutyl ester; the vinyl cyanide monomer may be acrylonitrile or methacrylonitrile; the unsaturated carboxylic acid amide may be acrylamide, methacrylamide, itaconic amide, or maleic acid monoamide or their derivatives; and the aromatic vinyl monomers may be at least one of a-methylstyrene, vinyl toluene, and p-methylstyrene.

The polymer resin included in the encapsulated colorant of the present general inventive concept may be prepared by polymerizing the polymer resin forming composition which includes two or more polymerizable unsaturated monomers, and the glass transition temperature of the polymer resin may be controlled by regulating the content ratio of the two or more polymerizable unsaturated monomers.

The glass transition temperature of the polymer resin may be controlled to be −15 to 75° C., and preferably 10 to 60° C. If the glass transition temperature is lower than −15° C., the softness of the polymer resin may be such that Kogation occurs, in which the polymer resin sticks to an inkjet heater, shortening the ink discharge duration, and if the glass transition temperature is higher than 75° C., the hardness of the polymer resin may be such that adhesiveness to paper is reduced, and fastness against rubbing is diminished.

That is, the glass transition temperature of the resulting polymer resin can be controlled by regulating the glass transition temperature of homopolymers made up of a single type of monomer and the content ratio of the polymerizable unsaturated monomers.

As a reference, glass transition temperatures of examples of homopolymers of the polymerizable unsaturated monomers are provided in the following table:

| Homopolymer | $T_g$ (glass transition temperature, ° C.) | $T_g$ (glass transition temperature, K) |
|---|---|---|
| Polystyrene | 100 | 373 |
| Polymethamethylacrylate | 105 | 378 |
| Polyacrylonitrile | 87 | 360 |
| Polymethacrylate | 9 | 282 |
| Polyethylene acrylate | −22 | 251 |
| Polybutyl acrylate | −55 | 218 |
| Polyacrylic acid | 106 | 379 |
| Polybutadiene | −105 | 168 |
| Polymethacrylic acid | 228 | 501 |
| Polyvinyl acetate | 32 | 305 |

(Source: Emulsion Polymerization and Emulsion Polymers, Peter A. Lovell & Mohamed S. El-Aasser, p.624)

When the above-listed homopolymers are mixed, heteropolymeric resins with various $T_g$ s may be synthesized, and the $T_g$ of the synthesized resin can be calculated as follows:

$$\frac{1}{T_g} = \sum_{k=1}^{n} \frac{W_k}{T_{gk}} \quad \text{[Equation 1]}$$

wherein $T_g$ is the glass transition temperature (K) of the polymer resin, $T_{gk}$ is $T_g$ of the homopolymer of the kth polymerizable unsaturated monomer, $W_k$ is mass fraction of the kth polymerizable unsaturated monomer, and n is an integer of 1 to 1,000.

That is, Equation 1 may be expressed as follows:

$$1/T_g = w_1/T_{g1} + w_2/T_{g2} + \ldots + w_n/T_{gn}$$

Here, $w_1, w_1 \ldots w_n$ refer to mass fractions of each monomer, and $T_{g1}, T_{g2}, \ldots T_{gn}$ refer to the $T_g$ of each of the homopolymers.

The encapsulated colorant of the present general inventive concept can be prepared by emulsifying the polymer resin-forming composition including polymerizable unsaturated monomers, an aqueous solvent, a colorant, a chain transferring agent, an emulsifying agent and a polymerization initiator, and then polymerizing the polymerizable unsaturated monomers on the colorant to elongate the polymers into a polymer resin coating the colorant.

The polymerizable unsaturated monomers may include at least one of unsaturated carboxylic acid, vinyl cyanide monomer, unsaturated carboxylic acid alkyl ester, unsaturated carboxylic acid hydroxyalkyl ester, unsaturated carboxylic acid amide and its derivatives, aromatic vinyl monomer, methyl vinyl ketone, and vinyl-idene chloride as previously described.

The aqueous solvent may be water or a combined solvent of water and an organic solvent. The content of the aqueous solvent may be 500 to 5,000 parts by weight, and more specifically, 1,500 to 3,000 parts by weight based on 100 parts by weight of the polymerizable unsaturated monomer. If the content of the aqueous solvent is less than 500 parts by weight based on 100 parts by weight of the polymerizable unsaturated monomer, the reaction proceeds too rapidly, and thus the coating resin becomes too thick. If the content of the aqueous solvent is greater than 5,000 parts by weight based on 100 parts by weight of the polymerizable unsaturated monomer, it is difficult for the monomers to move to reaction sites, and the reaction is performed too slowly, and thus the resin coating is hindered.

The colorant may include at least one of direct dyes, acidic dyes, alkaline dyes, reactive dyes, dispersant dyes, oil-based dyes, pigments, self-dispersing pigments as previously mentioned.

The content of the colorant may be 100 to 300 parts by weight, and more specifically, 150 to 250 parts by weight based on 100 parts by weight of the polymerizable unsaturated monomers. If the content of the colorant is less than 100 parts by weight based on 100 parts of the polymerizable unsaturated monomers, the content of the resin coating the colorant is increased to a level at which it is difficult to express the original color of the colorant, and if the content of the colorant is greater than 300 parts by weight based on 100 parts of the polymerizable unsaturated monomers, the content of the resin coating the colorant is decreased to a level at which it is difficult to form a suitable encapsulated colorant.

The chain transferring agent plays a role in improving the printing properties of ink compositions using such colorant by controlling the polymerizability, the molecular weight, and the cross-linking ability of the polymer resin coating the colorant.

The chain transferring agent may include at least one of sulfur-based compounds, phosphorous acid compounds, hypophosphorous acid compounds, and alcohols, but the present general inventive concept is not limited thereto. Preferably, sulfur-based compounds are used as the chain transferring agent due to their efficient radical generation.

The sulfur-based compounds may be represented by Formula 1 below:

[Formula 1]

wherein R is a C1-C20 substituted or non-substituted alkyl group, and SH is a sulfer-based compound.

Specific examples of the sulfur-based compounds include n-dodecyl mercaptan, t-dodecyl mercaptan, t-hexadecyl mercaptan, lauryl mercaptan, thioglycolic acid, thioacetic acid, and mercapthoethanol and the like, but the present general inventive concept is not limited thereto.

The phosphorous acid compounds may include phosphorous acid or sodium phosphorate, the hypophosphorous acid compounds may include hypophosphorous acid or sodium hypophosphorate, and the alcohols may include methyl alcohol, ethyl alcohol, isopropyl alcohol and n-butyl alcohol.

The content of the chain transferring agent may be approximately 0.05 to 5 parts by weight, and preferably, 0.5 to 2 parts by weight based on 100 parts by weight of the polymerizable unsaturated monomers. If the content of the chain transferring agent is less than 0.05 parts by weight based on 100 parts by weight of the polymerizable unsaturated monomer, a degree of cross-linking is too high, and if the content of the chain transferring agent is greater than 5 parts by weight based on 100 parts by weight of the polymerizable unsaturated monomer, the degree of cross-linking is too low.

The emulsifier may be a non-ionic emulsifier, an anionic emulsifier or an ampholytic emulsifier containing protons.

The content of the emulsifier may be approximately 0.01 to 10 parts by weight, and preferably 0.1 to 7 parts by weight based on 100 parts by weight of the polymerizable unsaturated monomers. If the content of the emulsifier is less than 0.01 parts by weight based on 100 parts by weight of the polymerizable unsaturated monomers, it is lower than a critical emulsifying concentration and therefore not efficient, and if the content of the emulsifier is greater than 10 parts by weight based on 100 parts by weight of the polymerizable unsaturated monomers, too much emulsifier is used, causing many bubbles even after the reaction is finished.

An emulsification method such as direct emulsification, comprising emulsifying within an aqueous solvent with added emulsifier using a dispersing tool such as a homomixer, a line mixer or a high pressure homogenizer, or natural emulsification comprising adding the emulsifier to the dispersed product of the colorant within the polymerizable unsaturated monomers and pouring the whole mixture into a large amount of water, may be used.

Moreover, phase-shift emulsification comprising adding the emulsifier to the dispersed product of the colorant within the polymerizable unsaturated monomers and then adding water by small amounts while stirring the mixture, may be used.

The polymerization initiator may include water-soluble or fat-soluble persulfates, azo compounds, or peroxides and a reducing agent such as redox composition composed of a mixture of hyposulfates. Such hyposulfates may include ammonium persulfate, potassium persulfate, sodium persulfate, hydrogen peroxide, t-butyl hydroperoxide, t-butyl peroxybenzoate, 2,2-azobis-isobutyronitrile, 2,2-azobis(2-diaminopropane)hydrochloride and 2,2-azobis(2,4-dimethylvaleronitrile).

The content of the polymerization initiator may be approximately 0.05 to 3 parts by weight, and preferably, 0.5 to 1.5 parts by weight based on 100 parts by weight of the polymerizable unsaturated monomers. If the content of the polymerization initiator is less than 0.5 parts by weight based on 100 parts by weight of the polymerizable unsaturated monomers, the reaction is not easily initiated and thus is slowed, and if the content of the polymerization initiator is greater than 3 parts by weight based on 100 parts by weight of the polymerizable unsaturated monomers, the reaction becomes too fast to control.

The polymerization initiator may be added early in the reaction along with the other materials participating in the polymerization reaction, that is, the polymerizable unsaturated monomers, the aqueous solvent, the colorant, the chain transferring agent, and the emulsifiers, or the polymerization initiator may be added after emulsifying the other materials followed by heating. In the former method, the rate of reaction is difficult to control, and in the latter method, the rate of reaction is easy to control.

Furthermore, the composition may further include cross-linkable monomers with two or more polymerizable unsaturated groups, in order to include a cross-linked structure in the polymer resin coating the colorant, thereby providing an effect of coating a tightly woven polymer resin on the colorant, according to the present general inventive concept.

The cross-linkable monomers may include at least one of (meth)acrylate and vinyl compounds.

The cross-linkable monomers may include (meth)acrylates such as trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, tris(2-hydroxyethyl)isocyanurate tri(meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, poly(meth)acrylate by-products of ethylene oxide or propylene oxides of the initial alcohol of the abovementioned (meth)acrylates, oligoester(meth)acrylate, oligoether(meth)acrylate, oligourethane(meth)acrylate, and oligoepoxy(meth)acrylate containing two or more (meth)acryloyl groups in molecules thereof.

The cross-linkable monomers may also include vinyl compounds such as butadiene, divinyl benzene, ethylene glycol divinyl ether, diethylene glycol divinyl ether, and triethylene glycol divinyl ether.

The content of the cross-linkable monomers may be approximately 10 to 80 parts by weight, and more particularly, 20 to 60 parts by weight based on 100 parts by weight of the polymerizable unsaturated monomers. If the content of the cross-linkable monomers is less than 10 parts by weight based on 100 parts by weight of the polymerizable unsaturated monomers, the cross-linkage level is too low, under which oversized polymer resin is synthesized, and if the content of the cross-linkable monomers is greater than 80 parts by weight based on 100 parts by weight of the polymerizable unsaturated monomers, the cross-linkage level is too high, under which polymer resin synthesized is too small to encapsulate the colorant, and therefore not desirable.

In addition, whenever necessary, the composition may further include additives such as UV absorber, antioxidants, and color enhancers.

Moreover, the present general inventive concept provides an ink composition including the encapsulated colorant, a solvent, and water.

In the ink composition according to the present general inventive concept, the content of the encapsulated colorant is approximately 0.1 to 30 parts by weight, and preferably, 1 to 20 parts by weight, and more preferably, 3 to 10 parts by weight based on 100 parts by weight of the ink composition.

If the content of the encapsulated colorant is less than 0.1 parts by weight based on 100 parts by weight of the ink composition, it is difficult to implement the desired optical density, and if the content of the encapsulated colorant is greater than 30 parts by weight based on 100 parts by weight of the ink composition, the viscosity of the ink composition is too high, and thus inkjet discharging performance is decreased, which is not desirable.

The solvent used in the ink composition according to the present general inventive concept may be an aqueous-based solvent such as water, and the solvent may further include one or more types of an organic solvent. The content of the solvent may be approximately 70 to 99.9 parts by weight, preferably 80 to 98 parts by weight, and more preferably, 90 to 97 parts by weight based on 100 parts by weight of the ink composition.

If the content of the solvent is less than 70 parts by weight based on 100 parts by weight of the ink composition, the viscosity of the ink composition becomes too high, and thus inkjet discharge performance may be decreased. On the other hand, if the content of the solvent is greater than 99.9 parts by weight based on 100 parts by weight of the ink composition, the inkjet discharge performance is decreased due to an increase in the surface tension of the ink composition, which is not desirable.

Organic solvents included in the solvent may include at least one of a monohydric alcohol-based solvent, ketone-based solvent, ester-based solvent, polyhydric alcohol-based solvent, nitrogen-containing solvent, and sulfur-based compound.

The alcohol-based solvent may be methyl alcohol, ethyl alcohol, isopropyl alcohol, n-butyl alcohol, sec-butyl alcohol, t-butyl alcohol, or isobutyl alcohol, the ketone-based solvent may be acetone, methylethyl ketone, diethyl ketone or diacetone alcohol, the ester-based solvent may be methyl acetate, ethyl acetate, or ethyl lactate, and the polyhydrc alcohol-based solvent may be ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate or trimethyl propane ethoxylate. Monohydric alcohols are used as the organic solvent control the surface tension of the ink, improving permeability on recording media such as normal paper or specialized paper, dot-forming ability, and drying properties of a printed image. Polyhydric alcohols and derivatives thereof do not evaporate easily, lowering the setting point of the ink and improving the storage stability of the ink, thereby acting to prevent clogging of nozzles.

The nitrogen-containing solvent t may be 2-pyrrolidone or N-methyl-2-pyrrolidone, and the sulfur-containing solvent may be dimethyl sulfoxide, tetramethyl sulfone, or thioglycol.

In the cases where such organic solvent is used together with a water-based solvent, the content of the organic solvent may be approximately 0.1 to 130 parts by weight, and preferably 10 to 50 parts by weight based on 100 parts by weight of water. If the content of the organic solvent is less than 0.1 parts by weight based on 100 parts by weight of water, the surface tension of the ink is too high; and if the content of the organic solvent is greater than 130 parts by weight based on 100 parts by weight of water, the viscosity of the ink increases, thereby lowering the discharge ability of the ink, which is not desirable.

The ink composition according to the present general inventive concept may include various additives in order to strengthen the properties of the ink composition. More specifically, the ink composition according to the present general inventive concept may include at least one additive from the group of additives consisting of a moisturizer, a dispersant, a surfactant, a viscosity controlling agent, a pH controlling agent, and an antioxidant. The content of the additive may be approximately 0.5 to 600 parts by weight, and preferably, 10 to 300 parts by weight based on 100 parts by weight of the colorant. If the content of the additive is less than 0.5 parts by weight based on 100 parts by weight of the colorant, it is difficult to express its potency, and if the content of the additive is greater than 600 parts by weight based on 100 parts by weight of the colorant, the storage stability of the ink composition deteriorates, which is not desirable.

In particular, there is no specific limitation on the type of surfactant used. In this regard, the surfactant can be selected appropriately according to the purpose thereof, and can be an amphoteric surfactant, an anionic surfactant, a cationic surfactant, or a nonionic surfactant. One type of surfactant may be used by itself, or two or more types may be used together.

The amphoteric surfactant may be, for example, dodecyldi (aminoethyl)glycine, di(octylaminoethyl)glycine, or N-alkyl-N,N-dimethylammoniumbetaine.

The anionic surfactant may be, for example, alkylbenzensulfonate salt, $\alpha$-olefinsulfonate salt, polyoxyethylene alkylether acetate salt, or a phosphate ester.

The cationic surfactant, for example, may be amine salt type surfactants such as alkyl amine salt, aminoalcohol fatty acid derivatives, polyamine fatty acid derivatives, and imidazoline, and level-four ammonium salt type surfactants such as alkyltrimethyl ammonium salt, dialkyldimethyl ammonium salt, alkyldimethylbenzyl ammonium salt, pyridinium salt, alkylisoquinolinium salt, and benzethonium chloride.

The non-ionic surfactant, for example, may be polyoxyethylene alkylether surfactant, polyoxyethylene alkyl phenyl ether surfactant, and acetylene glycol surfactant.

Among the above-described surfactants, non-ionic surfactants are preferable due to their superior packaging abilities. Preferable non-ionic surfactants may include SURFYNOL® group from Air Products Co. with an acetylenic ethoxylated diol structure, TERGITOL® group from Union Carbide Co. with a polyethylene oxide or a polypropylene oxide structure, and Tween group with a polyoxyethylene sorbitan fatty acid ester structure.

Preferably, the ink composition according to the present general inventive concept may have a surface tension of approximately 15 to 70 dyne/cm, preferably 25 to 55 dyne/cm, at 20° C., and a viscosity of 1 to 20 cps, preferably 1.5 to 3.5 cps at 20° C. If the surface tension of the ink composition is outside of the above range, printing performance is decreased, and if the viscosity of the ink composition is outside the above range, discharge does not occur easily, which is not desirable.

The present general inventive concept may also provide an ink set including two or more different types of ink composition described above.

In particular, the ink set may include one or more types of ink composition including an encapsulated colorant having a polymer resin with a glass transition temperature of −15 to 25° C.; and one or more types of ink composition including an encapsulated colorant having a polymer resin with a glass transition temperature of 30 to 75° C.

In the ink set using two types of ink composition as described above, the ink composition including an encapsulated colorant having a polymer resin with a relatively high glass transition temperature may be used in printing text, and the ink composition including an encapsulated colorant having a polymer resin with a relatively low glass transition temperature may be used in printing images.

That is, the encapsulated colorant including a polymer resin having a relatively high glass transition temperature is very hard, and therefore has a low diffusibility on paper, and the thickness after printing is unchanged, thereby producing text with superior optical density. Meanwhile, the encapsulated colorant including a polymer resin having a relatively low glass transition temperature has good diffusibility on paper, and can be evenly and smoothly spread on paper after printing, thereby producing an image having good endurance and print gloss. Thus, the ink set according to the present general inventive concept can provide improved printed results for both text and images.

In the ink set including the ink compositions each including encapsulated colorants coated with polymer resins with different glass transition temperatures, the glass transition temperature difference of the polymer resins may be approximately 5 to 90° C., preferably 5 to 55° C., and more preferably, 15 to 45° C. If the glass transition temperature difference is less than 5° C., qualities such as print gloss and optical density may be reduced, and if the difference is greater than 90° C., adhesiveness of the ink set may be reduced.

Such an ink set may be provided in an ink receptor unit of an inkjet recording device or an inkjet printer cartridge. An inkjet recording device according to the present general inventive concept may include a thermal head, which discharges ink fluid by vapour pressure from heating the ink composition, a piezo head, which discharges ink fluid using a piezo device, a disposable head, or a permanent head. Moreover, the inkjet recording device may be a scanning type printer or an array type printer, and may be used for desktops, textiles, and industrial manufacturing. Head types, printer types and uses thereof related to the inkjet recording device of the present general inventive concept are listed only to explain the inkjet recording device of the present general inventive concept in more detail, and clearly, the inkjet recording device in which the ink composition can be used is not limited to the previously described inkjet recording device, but may be used broadly.

Each substituent used in the definition of the compounds according to the present general inventive concept may be defined as follows:

An alkyl group, which is a substituent used in the present general inventive concept, refers to a monosaturated hydrocarbon moiety of the linear or branched chain with 1 to 20 carbons, preferably 1 to 10 carbons, and more preferably 1 to 6 carbons. Specific examples of an unsubstituted alkyl group, which is a substituent used in the present general inventive concept, include methyl, ethyl, propyl, isobutyl, sec-butyl, tert-butyl, pentyl, isoamyl, and hexyl, and one or more hydrogen atoms included in the alkyl group may be substituted by halogen atoms, hydroxy group, nitro group, cyano group, substituted or non-substituted amino groups (—NH2, —NH(R), —N(R')(R"), R' and R" are each independent C1 to C10 alkyl groups), amidino group, hydrazine or hydrazone groups, carboxyl group, sulfonate group, phosphate group, C1-C20 alkyl group, C1-C20 halogenated alkyl group, C1-C20 alkenyl group, C1-C20 alkinyl group, C1-C20 heteroalkyl group, C6-C20 aryl group, C6-C20 aryl alkyl group, C6-C20 heteroaryl group, or C6-C20 heteroarylalkyl group.

FIG. 1 illustrates a perspective view of an inkjet recording device including an inkjet printer cartridge, according to an embodiment of the present general inventive concept.

Referring to FIG. 1, the inkjet recording device 5 includes an inkjet printer cartridge 11 including an ink composition having a colorant containing a large chromophor and colorant-analogue additives. A printer cover 8 is connected to a main body 13 of the inkjet recording device 5. An interlocked area on a movable latch 10 is protruded through a hole 7 in the main body 13. A fixed latch 9 is disposed on the inside surface of the printer cover 8 to correspond to the movable latch 10. The fixed latch 9 is interlocked with the movable latch 10, when the printer cover 8 is closed. The printer cover 8 includes a recess 14 corresponding to the interlocking area of the movable latch 10 extended through the hole 7. The inkjet printer cartridge 11 is installed to position ink on a paper 3 passing under the inkjet printer cartridge 11.

Figure 2:
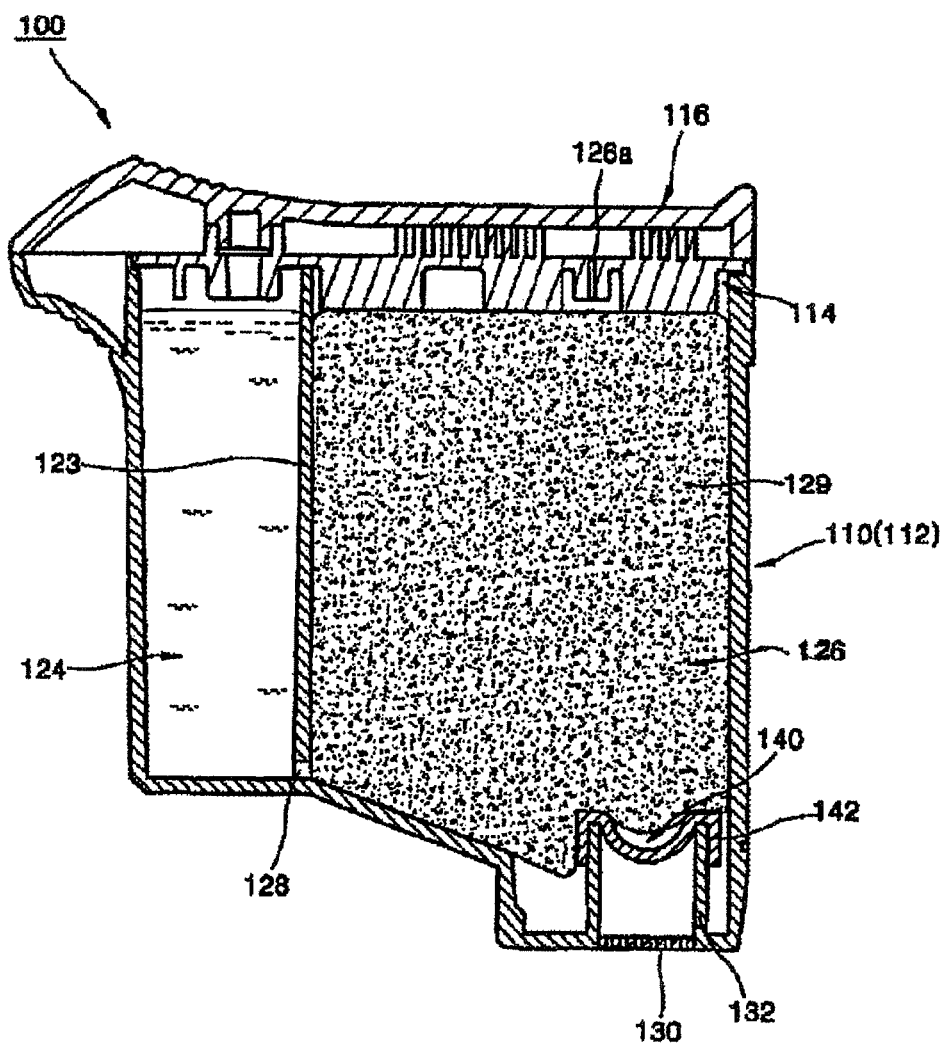
FIG. 2 illustrates a transverse cross-sectional view of the ink cartridge according to an embodiment of the present general inventive concept.

FIG. 2 illustrates a transverse cross-sectional view of an ink cartridge 100 including the ink set of the present general inventive concept, according to an embodiment of the present general inventive concept. Referring to FIG. 2, the inkjet printer cartridge 100 includes a cartridge body 110 forming an ink storage chamber 112, an inner cover 114 covering a top area of the ink storage chamber 112, and an outer cover 116 which is separated from the inner cover 114 by a predetermined distance and seals the ink storage chamber 112 and the inner cover 114.

The ink storage chamber 112 is divided into a first chamber 124 and a second chamber 126 by a vertical barrier wall 123. An ink passage 128 is formed on a bottom of the vertical barrier wall 123 between the first chamber 124 and the second chamber 126. The ink fills the first chamber 124 and a sponge 129 disposed in the second chamber 126. A vent hole 126a corresponding to the second chamber 126 is formed in the inner cover 114.

A filter 140 is formed at a lower part of the second chamber 126 and filters impurities and microbubbles to prevent clogging of an ejection hole of a printer head 130. A hook 142 is formed on the edge of the filter 140 and is coupled to the top part of a standpipe 132. The ink in the ink storage chamber 112 passes through the ejection hole of the printer head 130, and is discharged in a small drop form to the printing media.

Hereinafter, the present general inventive concept will be described more in detail with reference to the following examples and comparative examples. However, these examples and comparative examples are for descriptive purposes only and are not intended to limit the scope of the present general inventive concept.

Measurement of Glass Transition Temperature $T_g$

The glass transition temperatures of the polymer resin of the encapsulated colorant prepared in the Examples below were measured under 1 atmosphere and −50~200° C. with equipment DTA/DSC 703 by Baehr, Germany.

<Preparation of the Encapsulated Colorants>

EXAMPLE 1-1

1,360 g of deionized water, 333 g of carbon black (Cabot Co., cabojet-300), 7 g of sodium hydroxide, 9 g of disodium-didodecyldiphenyloxide disulfonate (DPOS 45, Cytec Co., U.S.), 80 g of butyl acrylate, 10 g of acrylic acid, and 120 g of styrene monomers were added to a high temperature-high pressure reactor (5 L) with a stirrer installed, and stirred at 250 rpm to produce a nitrogen substitution. The reactor pressure was increased to 2 kg/cm² by adding nitrogen to the reactor.

After sufficiently mixing all the added materials by stirring for 30 minutes, when the temperature of the reactor increased to 77° C., 0.36 g of ammonium persulfate was added. The temperature of the reactor was decreased to 70° C. and stirred for 300 minutes to produce an encapsulated colorant. The glass transition temperature ($T_g$) of the polymer resin of the resulting encapsulated colorant was 22.5° C. Here, the glass transition temperature of the polymer resin calculated according to Equation 1 above was 19.96° C.

EXAMPLE 1-2

1,360 g of deionized water, 298 g of carbon black (Cabot Co., cabojet-300), 7 g of sodium hydroxide, 9 g of disodiumdidodecyldiphenyloxide disulfonate (DPOS 45, Cytec Co., U.S.), 115 g of butyl acrylate, 10 g of acrylic acid, and 120 g of styrene monomers were added to a high temperature-high pressure reactor (5 L) with a stirrer installed, and stirred at 250 rpm to produce a nitrogen substitution. The reactor pressure was increased to 2 kg/cm² by adding nitrogen to the reactor. After sufficiently mixing all the added materials by stirring for 30 minutes, when the temperature of the reactor increased to 77° C., 0.36 g of ammonium persulfate was added. The temperature of the reactor was decreased to 70° C. and stirred for 300 minutes to produce an encapsulated colorant. The glass transition temperature ($T_g$) of the polymer resin of the resulting encapsulated colorant was 8.7° C. Here, the glass transition temperature of the polymer resin calculated according to Equation 1 above was 6.21° C.

EXAMPLE 1-3

1,360 g of deionized water, 231 g of carbon black (Cabot Co., cabojet-300), 7 g of sodium hydroxide, disodiumdidodecyldiphenyloxide disulfonate (DPOS 45, Cytec Co., U.S.), 10 g of acrylic acid, 120 g of styrene monomers, and 14.8 g of t-dodecyl mercaptan were added to a high temperature-high pressure reactor (5 L) with a stirrer installed, and stirred at 250 rpm to produce a nitrogen substitution. 10 g of butadiene monomers were added to the reactor and the reactor pressure was increased to 2 kg/cm² by adding nitrogen to the reactor. After sufficiently mixing all the added materials by stirring for 30 minutes, when the temperature of the reactor increased to 77° C., 0.36 g of ammonium persulfate was added. Then, the temperature of the reactor was decreased to 70° C. and stirred for 300 minutes to produce an encapsulated colorant. The glass transition temperature ($T_g$) of the polymer resin of the resulting encapsulated colorant was 73.2° C. Here, the glass transition temperature of the polymer resin calculated according to Equation 1 above was 69.13° C.

EXAMPLE 1-4

1,360 g of deionized water, 255 g of carbon black (Cabot Co., cabojet-300), 7 g of sodium hydroxide, disodiumdidodecyldiphenyloxide disulfonate (DPOS 45, Cytec Co., U.S.), 10 g of acrylic acid, 120 g of styrene monomers, and 21.4 g of t-dodecyl mercaptan were added to a high temperature-high pressure reactor (5 L) with a stirrer installed, and stirred at 250 rpm to produce a nitrogen substitution. 25 g of butadiene monomers were added to the reactor and the reactor pressure was increased to 2 kg/cm² by adding nitrogen to the reactor. After sufficiently mixing all the added materials by stirring for 30 minutes, when the temperature of the reactor was increased to 77° C., 0.36 g of ammonium persulfate was added. the temperature of the reactor was decreased to 70° C. and stirred for 300 minutes to produce an encapsulated colorant. The glass transition temperature ($T_g$) of the polymer resin of the resulting encapsulated colorant was 40.5° C. Here, the glass transition temperature of the polymer resin calculated according to Equation 1 above was 37.91° C.

<Manufacturing of the Ink Composition>

The encapsulated colorants manufactured in Examples 1-1 to 1-4 were each mixed with water, organic solvent, and additives, and then stirred sufficiently for at least 30 minutes to homogenize. The mixtures were filtered through a 0.45 μm filter to form the ink compositions of Examples 2-1 to 2-4. The ink compositions for Comparative Examples 1 to 4 were also manufactured with colorants, water, organic solvent, and additives according to the ratios below, using the same method for manufacturing the ink compositions of Examples 2-1 to 2-4.

EXAMPLE 2-1

| | |
|---|---|
| Encapsulated colorant prepared in Example 1-1 | 5 parts by weight |
| Glycerol | 5 parts by weight |
| Diethylene glycol | 8 parts by weight |
| Water (deionized) | 80 parts by weight |
| Glycerol propoxylate | 2 parts by weight |

EXAMPLE 2-2

| | |
|---|---|
| Encapsulated colorant prepared in Example 1-2 | 5 parts by weight |
| Glycerol | 3 parts by weight |
| Diethylene glycol | 8 parts by weight |
| Water (deionized) | 80 parts by weight |
| Trimethylolpropane propoxylate | 4 parts by weight |

EXAMPLE 2-3

| | |
|---|---|
| Encapsulated colorant prepared in Example 1-3 | 5 parts by weight |
| Glycerol | 2 parts by weight |
| Diethylene glycol | 8 parts by weight |
| Water (deionized) | 80 parts by weight |
| Pentaerythritol propoxylate | 5 parts by weight |

EXAMPLE 2-4

| | |
|---|---|
| Encapsulated colorant prepared in Example 1-4 | 5 parts by weight |
| Glycerol | 3 parts by weight |
| Diethylene glycol | 5 parts by weight |
| Water (deionized) | 80 parts by weight |
| 1,3-dimethyl-2-imidazolidinone | 3 parts by weight |
| 1,3-dimethyl-3,4,5,6-tetrahydro-pyrimidinone | 4 parts by weight |

COMPARATIVE EXAMPLE 1

| | |
|---|---|
| Raven 5250 (by Columbian Co.) | 5.0 parts by weight |
| Glycerol | 7.0 parts by weight |
| Diethylene glycol | 8.0 parts by weight |
| Water (deionized) | 80.0 parts by weight |

COMPARATIVE EXAMPLE 2

| | |
|---|---|
| Regal 330 (by Cabot co.) | 5.0 parts by weight |
| Glycerol | 7.0 parts by weight |
| Diethylene glycol | 8.0 parts by weight |
| Water (deionized) | 80.0 parts by weight |

COMPARATIVE EXAMPLE 3

| | |
|---|---|
| Furnace Black 101 (by Degussa Co.) | 5.0 parts by weight |
| Glycerol | 7.0 parts by weight |
| Diethylene glycol | 8.0 parts by weight |
| Water (deionized) | 80.0 parts by weight |

COMPARATIVE EXAMPLE 4

| | |
|---|---|
| CW-3 (by Orient Chemical Co.) | 5 parts by weight |
| Glycerol | 7 parts by weight |
| Diethylene glycol | 8.0 parts by weight |
| Water (deionized) | 80.0 parts by weight |

EXPERIMENTAL EXAMPLE 1

Rubbing Fastness Test

The ink compositions obtained from Examples 2-1 to 2-4 and Comparative Examples 1 to 4 were refilled into ink cartridges M-50 (by Samsung Co.), and then bar images (2*10 cm) were printed with a printer (MJC-3300p, by Samsung), and dried for 24 hours, followed by rubbing 5 times using a tester, where the OD of each of the transitioned images from the bar images was compared with the image OD of each of the bars before rubbing. The ratio of the OD of the transitioned images to the OD of the original images are expressed in percentages and evaluated below as illustrated in Table 1.

$A = (OD$ of transitioned image/$OD$ of original bar)*100 (%)

◎ = $A < 15$
○ = $15 \leq A \leq 30$
Δ = $30 \leq A \leq 45$
X = $A > 45$

EXPERIMENTAL EXAMPLE 2

Water Fastness Test

The ink compositions obtained from Examples 2-1 to 2-4 and Comparative Examples 1 to 4 were refilled into ink cartridges M-50 (by Samsung Co.), and bar images (2*10 cm) were printed with a printer (MJC-2400C, by Samsung Co.). After 5 minutes, 5 drops of water were dropped on the image, dried for 24 hours, and evaluated as follows by comparing a reduced OD from the water-run images and the OD of the original images and expressing the ratios in percentages. These results are presented in Table 1 below.

$A = (OD$ of the water-run image/$OD$ of original bar image)$\times 100$(%)

◎ = $95 \leq A$
○ = $90 \leq A \leq 95$
X = $85 \leq A < 90$
XX = $A < 85$

EXPERIMENTAL EXAMPLE 3

Print Gloss Test

The ink compositions obtained from Examples 2-1 to 2-4 and Comparative Examples 1 to 4 were refilled into ink cartridges M-50 (by Samsung Co.), and bar images (2*10 cm) were printed with a printer (MJC-2400C, by Samsung Co.). After 120 minutes, printed gloss was measured using a glossmeter, and evaluated as follows, with the results presented in Table 1 below.

A = glossiness of image
◎ = $40 \leq A$
○ = $35 \leq A < 40$
X = $30 \leq A \leq 35$
XX = $A < 35$

EXPERIMENTAL EXAMPLE 4

Optical Density (OD) Test

The ink compositions obtained from Examples 2-1 to 2-4 and Comparative Examples 1 to 4 were refilled into ink cartridges M-50 (by Samsung Co.), and bar images (2*10 cm) were printed with a printer (MJC-2400C, by Samsung Co.). After drying the images for 24 hours, image OD was expressed, using a tester, by evaluating as follows, with the results presented in Table 1.

A = OD of image
◎ = $A \geq 1.4$
○ = $1.2 \leq A < 1.4$
Δ = $1.0 \leq A \leq 1.2$
X = $A < 1.0$

TABLE 1

| | Encapsulated | Cross-linked | $T_g$ (° C.) | Rubbing Fastness | Water Fastness | Print Gloss | Optical Density |
|---|---|---|---|---|---|---|---|
| Example 2-1 | ○ | X | 22.5 | ◎ | ◎ | ◎ | ○ |
| Example 2-2 | ○ | X | 8.7 | ◎ | ◎ | ◎ | ○ |
| Example 2-3 | ○ | ○ | 73.2 | ◎ | ◎ | ○ | ◎ |
| Example 2-4 | ○ | ○ | 40.5 | ◎ | ◎ | ○ | ◎ |

TABLE 1-continued

|  | Encapsulated | Cross-linked | $T_g$ (° C.) | Rubbing Fastness | Water Fastness | Print Gloss | Optical Density |
|---|---|---|---|---|---|---|---|
| Comparative Example 1 | X | X | — | X | X | Δ | X |
| Comparative Example 2 | X | X | — | X | Δ | X | Δ |
| Comparative Example 3 | X | X | — | X | X | Δ | Δ |
| Comparative Example 4 | X | X | — | X | Δ | X | X |

Referring to Table 1 above, for Examples 2-1 to 2-4, which used the encapsulated colorant of the present general inventive concept, results show that rubbing fastness, water fastness, print gloss, and optical density are all superior to those of Comparative Examples 1 to 4, which used a conventional colorant without an encapsulated structure. In particular, for Examples 2-1 to 2-2 with low glass transition temperatures, the print gloss is highly superior, and for Examples 2-3 to 2-4 with high glass transition temperatures, the optical density is highly superior.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. An ink set, comprising:
    two or more ink compositions each including an encapsulated colorant, the encapsulated colorant comprising:
        a colorant; and
        a polymer resin that coats the colorant,
    wherein the polymer resin is formed from a composition comprising two or more polymerizable unsaturated monomers, and the content ratio of the two or more polymerizable unsaturated monomers is controlled to provide a glass transition temperature of the polymer resin of −15 to 75° C.; and wherein the ink set comprises:
        one or more ink compositions comprising an encapsulated colorant having a polymer resin with a glass transition temperature of −15 to less than 20° C.; and
        one or more ink compositions comprising an encapsulated colorant having a polymer resin with a glass transition temperature of 30 to 75° C.

2. A cartridge for an inkjet recording device, comprising:
    an ink set, having:
        two or more ink compositions each including an encapsulated colorant, the encapsulated colorant comprising:
            a colorant; and
            a polymer resin that coats the colorant,
        wherein the polymer resin is formed from a composition comprising two or more polymerizable unsaturated monomers, and the content ratio of the two or more polymerizable unsaturated monomers is controlled to provide a glass transition temperature of the polymer resin of −15 to 75° C.; and
    wherein the ink set comprises:
        one or more ink compositions comprising an encapsulated colorant having a polymer resin with a glass transition temperature of −15 to less than 20° C.; and
        one or more ink compositions comprising an encapsulated colorant having a polymer resin with a glass transition temperature of 30 to 75° C.

3. An inkjet recording device, comprising:
    a cartridge for an inkjet recording device, comprising:
        an ink set, comprising:
            two or more ink compositions each including an encapsulated colorant, the encapsulated colorant comprising:
                a colorant; and
                a polymer resin that coats the colorant,
            wherein the polymer resin is formed from a composition comprising two or more polymerizable unsaturated monomers, and the content ratio of the two or more polymerizable unsaturated monomers is controlled to provide a glass transition temperature of the polymer resin of −15 to 75° C.; and
        wherein the ink set comprises:
            one or more ink compositions comprising an encapsulated colorant having a polymer resin with a glass transition temperature of −15 to less than 20° C.; and
one or more ink compositions comprising an encapsulated colorant having a polymer resin with a glass transition temperature of 30 to 75° C.

* * * * *